(12) United States Patent
Liu et al.

(10) Patent No.: US 6,491,837 B1
(45) Date of Patent: *Dec. 10, 2002

(54) POLISHING SLURRY

(75) Inventors: Lei Liu, Carmel; Doris Kwok, Fishers, both of IN (US)

(73) Assignee: Praxair S.T. Technology, Inc., New Haven, CT (US)

( * ) Notice: Subject to any disclaimer, the term of this patent is extended or adjusted under 35 U.S.C. 154(b) by 32 days.

This patent is subject to a terminal disclaimer.

(21) Appl. No.: 09/740,825

(22) Filed: Dec. 21, 2000

Related U.S. Application Data

(63) Continuation-in-part of application No. 09/484,242, filed on Jan. 18, 2000, now Pat. No. 6,299,795.

(51) Int. Cl.[7] .............................. B44C 1/22; C23F 1/00
(52) U.S. Cl. .............................. 216/89; 216/38; 216/88; 216/100; 252/79.2; 252/79.4; 438/693; 438/745
(58) Field of Search .............................. 216/38, 88, 89, 216/91, 100; 252/79.1, 79.2, 79.4, 79.5; 438/691, 692, 693, 745, 754; 451/36; 51/309; 106/3

(56) References Cited

U.S. PATENT DOCUMENTS

| | | | | |
|---|---|---|---|---|
| 5,868,604 A | | 2/1999 | Atsugi et al. | .................. 451/36 |
| 6,149,696 A | | 11/2000 | Jia | .............................. 51/308 |
| 6,299,795 B1 | * | 10/2001 | Liu et al. | ................... 252/79.2 |
| 6,316,366 B1 | * | 11/2001 | Kaufman et al. | ........... 438/693 |

FOREIGN PATENT DOCUMENTS

| | | |
|---|---|---|
| EP | 411413 | 2/1991 |
| JP | 11246849 | 9/1999 |
| WO | 9823697 | 6/1998 |

* cited by examiner

*Primary Examiner*—William A. Powell
(74) *Attorney, Agent, or Firm*—Blake T. Biederman

(57) ABSTRACT

The polishing slurry includes polishing particles having a mean particle diameter of less than about 5 $\mu$m. The slurry contains at least about 0.5 total weight percent oxidizer selected from at least one of the group consisting of $HNO_3$, $Ni(NO_3)_2$, $Al(NO_3)_3$, $Mg(NO_3)_2$, $Zn(NO_3)_2$ and $NH_4NO_3$. A small but effective amount of a co-oxidizer selected from the group consisting of perbromates, perchlorates, periodates, persulfates, permanganates, ferric nitrate, cerium-containing salts, perbenzoic acids, nitrite compounds, perborate compounds, hypochlorite compounds, chlorite compounds and chloride compounds accelerates removal of substrates; and water forms the balance of the aqueous slurry.

32 Claims, 1 Drawing Sheet

POLISHING SLURRY

This is a continuation-in-part of prior U.S. application Ser. No. 09/484,242, filed Jan. 18, 2000, U.S. Pat. No. 6,299,795.

TECHNICAL FIELD

This invention relates to polishing slurries. In particular, this invention relates to slurries for polishing nickel-plated hard disks with an enhanced removal rate and a reduced surface roughness.

BACKGROUND ART

The typical manufacturing process for memory hard disk media involves plating an aluminum disk substrate with a layer of nickel phosphorus alloy. Polishing this nickel alloy's surface with a fine polishing slurry obtains a smooth and flat surface. This polished nickel-plated substrate is then suitable for application of a layer of magnetic storage media, such as used for hard disks. The increasing demands for higher storage capacity in hard drive manufacturing have necessitated a substantial increase in areal density, i.e., data storage capacity per unit surface area, on the disk media. This requires that significant improvements be made in the manufacturing of the rigid hard disks, including enhanced plating uniformity, reduced surface roughness after polishing, and enhanced texturing characteristics. The polishing process is one of the critical factors required to fulfill these new requirements.

Significant improvements in surface inspection metrology have allowed disk manufacturers to inspect for small surface defects previously undetectable. This technology advancement has led to optimization of polishing parameters to reduce defects including: polishing cycle time; polishing pressure; and resolution rate of upper and lower table of the polishing machine. Optimizing polishing parameters requires a high degree of expertise and is time consuming. Other advances have been made in the area of consumables, such as, polishing pads, abrasive slurries, and cleaning materials. Unfortunately, conventional aluminum oxide slurries (5 to 50 $m^2/g$, surface area and 1 to 10 $\mu m$ mean diameter, size distribution) create micro-scratches and micro-pits on substrates' surfaces. Because these slurries create these defects, it is difficult for disk manufacturers to obtain smooth surfaces using conventional alumina slurries, i.e., a roughness of less than 3Å, which is preferred for good deposition of a magnetic layer.

Conventional polishing slurries can result in uneven plating of the magnetic layer after polishing the substrate. Since the clearance between magnetic heads and the magnetic layer is less than 0.2 $\mu m$, small surface defects on the magnetic layer such as nodules may crash and damage the magnetic heads. Other defects, such as scratches and pits, cause errors in reading or writing information on hard disks. There are several possible causes for these defects, including: 1) the surface morphologies of the aluminum oxide abrasives are irregular or contain sharp edges where the grinding action of these abrasives on the substrate's surface introduces polish scratches; 2) the presence of unwanted fine aluminum oxide particles generated from the abrasive's size reduction process causes micro-pits; and 3) the agglomeration of the aluminum oxide particles in the polishing slurry and in the pores of the polishing pads causes scratches or pits in the substrate's surface. For the above reasons, it is difficult for disk manufacturers to achieve a defect-free and low roughness surface, i.e., Ra (peak-to-valley height) of less than 3 Å with conventional alumina-based slurries.

The increasing demands of the computer hard disk industry for defect-free and low roughness surfaces have forced slurry manufacturers to explore alternative polishing agents, such as, solution derived colloidal metal oxide materials. The mean diameters of these colloidal particles are typically in the range of 0.01 to 1 $\mu m$; and these small and soft particles potentially offer enhanced substrate surface characteristics. However, slurry manufacturers are currently encountering two problems with colloidal slurries. First, the polishing rates of these slurries are substantially lower than conventional alumina-based slurries—disk manufacturers utilizing colloidal based slurries have to increase polishing cycle time, slurry consumption and even the number of polishing machines in order to maintain the required production throughput. Second, these colloidal particles also have a strong tendency to aggregate, coagulate and gel due to their small particle sizes, high ionic strength, and the low pH range. Therefore, colloidal slurries often have a short or insufficient shelf life.

Manufacturers have attempted to use smaller and/or softer alumina-based abrasive particles and different chemical additives such as chelating agents and oxidizers to reduce or eliminate surface irregularities. Furthermore, slurry manufacturers have attempted to use various unstable oxidizers such as hydrogen peroxide, aluminum nitrate and ferric nitrate to enhance the polishing removal rate. These oxidizers cannot be premixed with the slurry; and disk manufacturers must add these oxidizers, such as ferric nitrate, at their point of use. The use of ferric nitrate is also undesirable because it stains the polishing equipment.

Other manufacturers have used various unconventional abrasives such as boehmite and fumed metal oxides to achieve smooth substrates surfaces. Kodama et al., in U.S. Pat. No. 5,575,837, disclose the use of a persulfate accelerator with a silica sol or gel. In addition, Streinz et al., in PCT Pub. No. 98/23697 disclose the use of a triple salt of $2KHSO_5 \cdot KHSO_4 \cdot K_2SO_4$ (approximately 50% monopersulfate) or hydrogen peroxide oxidizers with a ferric nitrate catalyst for use with fumed silica and alumina dispersions for polishing hard disk substrates.

Dromard et al., in U.S. Pat. No. 5,418,273, disclose the use of anionic dispersing agents, such as sodium polyacrylate or polymethacrylate. These dispersing agents stabilize an aqueous suspension of anhydrous alumina and silica for papermaking industry coatings. Some slurry manufacturers have attempted to stabilize basic colloidal silica slurries, which is stable over an extended period of time. Although the suspension is stable, the polishing rate is substantially slower than conventional acidic alumina slurries. Adding various chemical oxidizers such as hydrogen peroxide, aluminum nitrate and ferric nitrate to these slurries increases their polishing rate. These oxidizers either reduce the shelf life of the slurries or they become unstable before they reach the end-users. Another alternative is to add the oxidizer solution to the slurries at the point of use; however, it is undesirable for disk manufacturers, because special handling and storage facilities for the hazardous materials are required at end-users' sites.

It is an object of the invention to provide a slurry for reducing surface roughness of metal substrates.

It is a further object of the invention to provide a slurry for accelerating the polishing process.

It is a further object of the invention to provide a stable colloidal polishing slurry with enhanced polishing characteristics and minimized surface defects.

It is a further object of the invention to provide a polishing slurry having improved polishing performance on Ni-P plated substrates for computer hard disks.

SUMMARY OF THE INVENTION

The polishing slurry includes polishing particles having a mean particle diameter of less than about 5 µm. The slurry contains at least about 0.5 total weight percent oxidizer selected from at least one of the group consisting of $HNO_3$, $Ni(NO_3)_2$, $Al(NO_3)_3$, $Mg(NO_3)_2$, $Zn(NO_3)_2$ and $NH_4NO_3$. A small but effective amount of a co-oxidizer selected from the group consisting of perbromates, perchlorates, periodates, persulfates, permanganates, ferric nitrate, cerium-containing salts, perbenzoic acids, nitrite compounds, perborate compounds, hypochlorite compounds, chlorite compounds and chloride compounds accelerates removal of substrates; and water forms the balance of the aqueous slurry.

The method of polishing optionally contains the following steps to maintain oxidation potential. First, introducing a precursor polishing slurry into a mixing vessel, the polishing slurry contains polishing particles; at least about 0.5 weight percent total oxidizer, the oxidizer being selected from at least one of the group consisting of $HNO_3$, $Ni(NO_3)_2$, $Al(NO_3)_3$, $Mg(NO_3)_2$, $Zn(NO_3)_2$ and $NH_4NO_3$; and balance water. Then mixing a small but effective amount of co-oxidizer into the precursor polishing slurry forms an active polishing slurry, the co-oxidizer being selected from at least one of the group consisting of perbromates, perchlorates, periodates, persulfates, permanganates, ferric nitrate, cerium-containing salts, perbenzoic acids, nitrite compounds, perborate compounds, hypochlorite compounds, chlorite compounds and chloride compounds. Then, polishing the substrate, with the active polishing slurry with the co-oxidizer having at least eighty percent of its as mixed oxidation potential, maximizes polishing rate.

DETAILED DESCRIPTION

Figure 1:
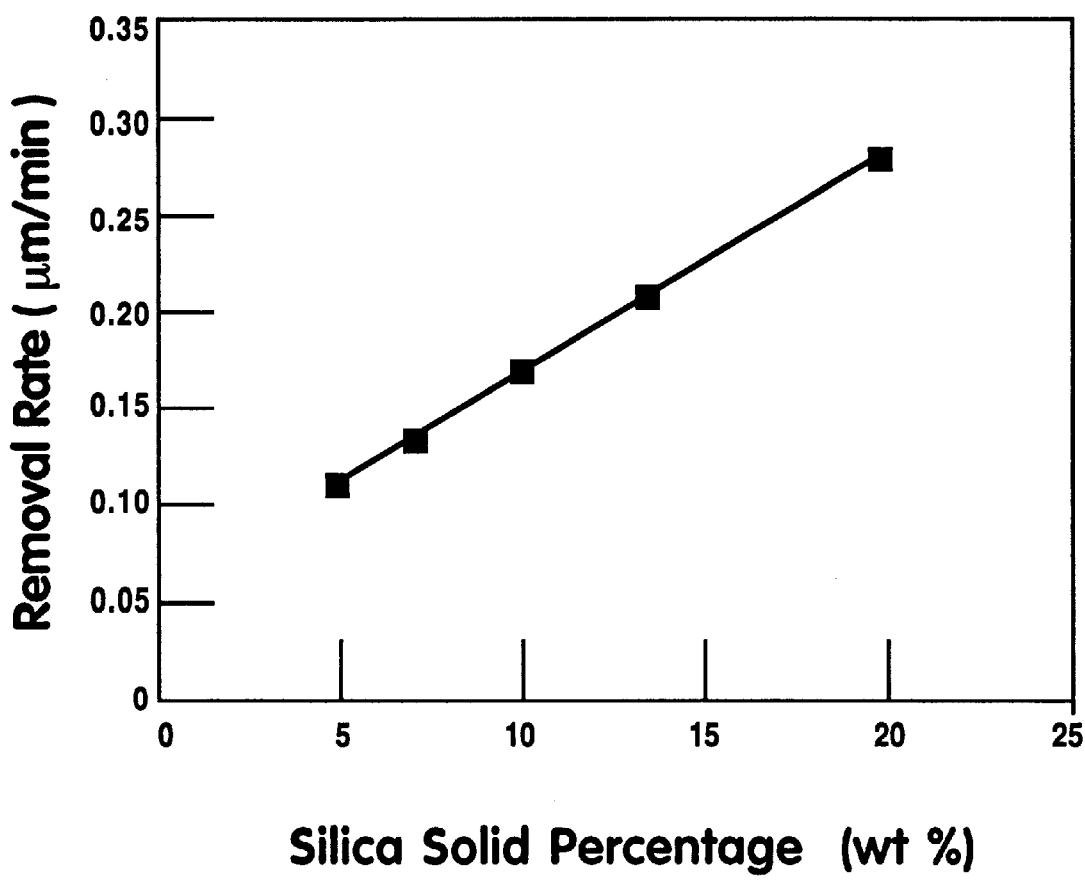
FIG. 1 shows nickel stock removal rate's dependence on the silica colloid concentration.

The present invention relates to polishing slurry compositions that enhance polishing characteristics. These slurries contain abrasive particles or colloidal materials such as oxides, nitrides, carbides and borides as a polishing agent. The use of colloidal-sized particles in the polishing slurry substantially improves the substrate surface characteristics, reduces surface roughness and minimizes or eliminates all surface defects. The use of multi-oxidizer combination in the slurry greatly enhances the polishing rate by 50 to 250 percent. Typical oxidizers and co-oxidizers include nitric acid, metal salts of nitrate, perchlorate, persulfate, periodate and permanganate. The concentrations of these oxidizers and co-oxidizers operate in the range of 0.01 to 50 total weight percent. Unless expressly noted otherwise, this specification refers to all compositions in weight percent. For economic reasons however, the slurry advantageously operates with less than 10 weight percent total oxidizers and co-oxidizers. Although this slurry operates on various metallic and non-metallic surfaces, it provides superior polishing for nickel-plated rigid hard disks. For example, this polishing mixture achieves a surface roughness of less than about 2 Å for nickel-phosphorus-plated hard disks.

The composition of this slurry relies upon the interaction of several ingredients. Water serves as the dispersing medium of the slurry and forms the balance of the composition.

Advantageously, adding about 2 to 60 weight percent polishing particles, having a mean particle diameter of less than about 5 µm (advantageously, less than 1 µm), forms the aqueous slurry. Examples of polishing agents include oxides, nitrides, carbides and borides. In particular, colloidal oxides, such as silica, alumina, ceria, zirconia, titania having a mean diameter less than about 1 µm form excellent polishing slurries for ultra-smooth surfaces. A typical polishing slurry described here, normally an aqueous dispersion, is made up of silica or alumina colloidal polishing agents with having a mean diameter preferably in the range of about 0.01 µm to 1 µm. The minimum mean diameter of at least 0.01 µm ensures commercially practical nickel-phosphorus removal rates.

The slurry contains at least 0.5 total weight percent total of at least one or a combination of primary oxidizers or accelerators selected from the group consisting of $HNO_3$, $Ni(NO_3)_2$, $Al(NO_3)_3$, $Mg(NO_3)_2$, $Zn(NO_3)_2$ and $NH_4NO_3$. Experimental data have shown that iron nitrate compounds do not serve as effective primary oxidizers. Unlike the nitrate compounds of the above list that oxidize the substrate by forming nitric acid in a water solution, the ferric component in iron nitrate functions as a relatively weak oxidizer. Advantageously, the oxidizer consists of about 0.5 to 7.5 total weight percent of the slurry. Most advantageously, the primary oxidizer forms about 0.5 to 5 total weight percent of the slurry.

In addition to the oxidizer, the slurry contains a small but effective amount of at least one or more co-oxidizers selected from the group consisting of perbromates, perchlorates, periodates, persulfates, permanganates, ferric nitrate, cerium-containing salts, perbenzoic acids, nitrite compounds, perborate compounds, hypochlorite compounds, chlorite compounds and chloride compounds. Small amounts as low as at least about 0.01 total weight percent co-oxidizer appears to have a synergistic effect with the oxidizer in the slurry. Specific examples of effective co-oxidizers include, $KIO_4$, $NaIO_4$, $(NH_4)_2S_2O_8$, $K_2S_2O_8$, $Na_2S_2O_8$, $KMnO_4$, $Al(ClO_4)_3$, $KClO_4$, $NaClO_4$, $NH_4ClO_4$, $Fe(ClO_4)_3$, $(NH_4)_2Ce(NO_3)_6$, $NaNO_2$, $KCl$, $NaBO_3$, $ClC_6H_4CO_3H$, $NaClO$, $NaClO_2$, and $Fe(NO_3)_3$. Advantageously, the slurry contains about 0.01 to 4 total weight percent co-oxidizer to accelerate the removal of the substrate. Most advantageously, the slurry contains about 0.05 to 2 total weight percent co-oxidizer for optimal removal of nickel-phosphorus substrates.

When using periodate salts as co-oxidizers, most advantageously the polishing slurry contains an additive for preventing elemental iodine from releasing into the atmosphere. These additives include polymers and co-polymers (with the linear and crosslinked structures of these polymers and co-polymers) such as, polyvinylpyridine and polyvinylpyrrolidone, vinylpyrrolidone/vinylacetate, vinylpyrrolidone/vinylmethacrylate, vinylpyrrolidone/vinylacrylic acid, vinylpyrrolidone/styrene, vinylpyrrolidone/vinylcaprolactam, vinylpyrrolidone/vinylimidazole, etc. Linear polymers of various molecular weights may tie-up the iodine produced during the polishing process. Similarly, co-polymers of various co-polymer ratios and combinations can tie-up the iodine. Furthermore, crosslinked polymers of all various crosslink percentages bind the iodine. In addition, derivatives of these polymer additives, such as, substitutions should also be effective in binding iodine.

Optionally, pH buffers or adjusters such as, strong acids maintain the slurry as an acidic solution. For example, nitric, sulfuric, hydrochloric, acetic, gluconic and succinic acids readily adjust pH to the most advantageous range. Most advantageously, the pH buffers adjust the slurry's pH to a value between about 1 and 5. In addition, when using colloidal particles, it is advantageous to add an anti-coagulation agent to the slurry. Advantageously, the slurry contains a total of about 0.001 to 5 percent by weight of the anti-coagulation agents. Most advantageously it contains a polymeric anti-coagulation agents, such as polyvinylsulfonate, polystyrenesulfonate, polyacrylate, polystyrenesulfonic-co-maleic acid or an equivalent.

When preparing the slurry, manufacturers can use either solid or aqueous solution forms of anti-coagulation agents, oxidizer(s), and co-oxidizers. Furthermore, it is advantageous to prepare the slurry dispersion under agitation.

In the examples presented herein, the polishing performance of different slurries was evaluated on a Strasbaugh 6EE polisher, in which nickel-phosphorus plated memory hard disks were polished by sliding the disks between two rotating and pressed polymeric pads. The down pressure used was 80 g/cm$^2$. The polishing pads were Politex DG HI made by Rodel Inc. The disks were polished for 6 minutes and the slurry flow rate was set constant at 325 ml/minute. After completion of each polishing cycle, the disks were cleaned in a Vtech disk cleaner and dried with a Semitool spin rinser/dryer. The nickel stock removal rate was determined by measuring the total mass loss of the disks before and after polishing; whereas the surface roughness (Ra) was measured by a Veeco TMS 2000 and a Digital Instruments AFM apparatus. The surface defects were examined visually using an optical microscope and also using an optical inspection system, Hitachi RS1350.

Table 1 shows examples of polishing performance for various slurry compositions (Samples A and B represent comparative examples). Without any oxidizer, the silica colloids alone resulted in nearly zero removal rate that indicated the absence of mechanical abrasion from colloid particles. With various oxidizer and co-oxidizer combinations however, the total nickel stock removal rate was achieved as high as 0.28 $\mu$m/min. The primary oxidizers contributed up to 50 percent of the total removal rate and were also essential to maintain good substrate flatness. Addition of various co-oxidizers and their combinations increased the removal rate by as much as two-fold. Among all of the co-oxidizers, periodate salt was the most effective removal rate booster. Although the presence of co-oxidizers and their combinations increased removal rates significantly, the benefit diminished as their concentration increased. This indicated that optimal quantity and combination of co-oxidizers were critical to maximize the total removal rate. Excessive amounts of co-oxidizers gave no additional removal rate improvement. The overall results shown in Table 1 may also suggest that the silica colloids only serve as carriers that assist the chemical polishing process rather than directly contributing to nickel removal through mechanical abrasion.

TABLE 1

Examples of Polishing Performance Data for Various Slurry Compositions

| Sample ID | Abrasive, (wt %) | Mean Diameter (nm) | Oxidizer (wt %) | Co-Oxidizers (wt %) | Removal Rate ($\mu$m/min) |
|---|---|---|---|---|---|
| A | SiO$_2$, 14 | 100 | None | None | ~0 |
| B | SiO$_2$, 14 | 100 | 2.6 Al (NO$_3$)$_3$, 2.2 NH$_4$NO$_3$ | None | 0.10 |
| 1 | SiO$_2$, 14 | 100 | 2.6 Al (NO$_3$)$_3$, 2.2 NH$_4$NO$_3$ | 0.26 KIO$_4$ | 0.22 |
| 2 | SiO$_2$, 14 | 100 | 2.6 Al (NO$_3$)$_3$, 2.2 NH$_4$NO$_3$ | 0.26 (NH$_4$)$_2$S$_2$O$_8$ | 0.14 |
| 3 | SiO$_2$, 14 | 100 | 2.6 Al (NO$_3$)$_3$, 2.2 NH$_4$NO$_3$ | 0.26 Al (ClO$_4$)$_3$ | 0.12 |
| 4 | SiO$_2$, 7 | 100 | 2.6 Al (NO$_3$)$_3$, 2.2 NH$_4$NO$_3$ | 0.26 NaIO$_4$ | 0.17 |
| 5 | SiO$_2$, 7 | 100 | 2.6 Al (NO$_3$)$_3$, 2.2 NH$_4$NO$_3$ | 0.26 NaIO$_4$, 0.26 (NH$_4$)$_2$S$_2$O$_8$ | 0.20 |
| 6 | SiO$_2$, 5.3 | 100 | 2.6 Al (NO$_3$)$_3$, 2.2 NH$_4$NO$_3$ | 0.42 NaIO$_4$, 0.26 (NH$_4$)$_2$S$_2$O$_8$ | 0.19 |
| 7 | SiO$_2$, 8.5 | 40 | 2.6 Al (NO$_3$)$_3$, 2.2 NH$_4$NO$_3$ | 0.26 NaIO$_4$ | 0.25 |
| 8 | SiO$_2$, 8.5 | 40 | 2.6 Al (NO$_3$)$_3$, 2.2 NH$_4$NO$_3$ | 0.50 NaIO$_4$ | 0.25 |
| 9 | SiO$_2$, 6.4 | 40 | 2.6 Al (NO$_3$)$_3$, 2.2 NH$_4$NO$_3$ | 0.42% NaIO$_4$, 0.26 (NH$_4$)$_2$S$_2$O$_8$ | 0.28 |
| 10 | SiO$_2$, 6.4 | 40 | 2.6 Al (NO$_3$)$_3$ | 0.42 NaIO$_4$, 0.26 (NH$_4$)$_2$S$_2$O$_8$ | 0.26 |
| 11 | SiO$_2$, 6.4 | 40 | None | 0.42 NaIO$_4$, 0.26 (NH$_4$)$_2$S$_2$O$_8$ | 0.18 |

Referring to FIG. 1, the nickel removal rate increased as a linear function with the silica solid percentage.

The unique colloidal particle characteristics achieved atomic-scale smoothness and scratch-free polished surfaces. By using the described slurry compositions, the typical surface roughness (Ra) ranged from 1 Å to 2.5 Å A measured by TMS 2000 and AFM apparatus. The colloidal particles described were solution-derived, amorphous-structured, and spherical-shaped particulate. Most advantageously, single discrete spheres dispersed individually in the aqueous medium to form the slurry suspensions. These non-coagulated, soft (amorphous) spheres most advantageously achieve a low roughness and defect-free polishing surfaces.

The chemical instability of these "unstable" co-oxidizers presents practical problems in polishing applications, such as shelf-life and inconsistent polishing performance.

One solution to the above instability issues is to store the above co-oxidizers in their stable forms, i.e. pure and/or dry forms, and incorporate them into the slurry at or near the point of polishing application. For example, mixing the co-oxidizer into an aqueous solution one hour before polishing solves the stability issue for most oxidizer combinations. This approach dramatically shortens the contact time of the co-oxidizers in an aqueous environment and other conditions that cause them to be unstable. The decomposition rates of the co-oxidizers listed above are in the time

TABLE 2 illustrates additional multi-oxidizer systems and that provide high nickel removal rates.

| Sample ID | Abrasive, (wt %) | Mean Diameter (nm) | Oxidizer (wt %) | Co-Oxidizers (wt %) | Removal Rate (□m/min) |
|---|---|---|---|---|---|
| 12 | $SiO_2$, 8 | 40 | 1.4, $NH_4NO_3$ | 1.4, $(NH_4)_2S_2O_8$; 0.6, $(NH_4)_2Ce(NO_3)_6$ | 0.25 |
| 13 | $SiO_2$, 8 | 40 | 1.4, $NH_4NO_3$ | 1.4, $(NH_4)_2S_2O_8$; 0.6, $NaNO_2$ | 0.28 |
| 14 | $SiO_2$, 8 | 40 | 1.4, $NH_4NO_3$ | 0.6, $(NH_4)_2S_2O_8$; 0.2, $Fe(NO_3)_3$ | 0.28 |
| 15 | $SiO_2$, 8 | 40 | 1.4, $NH_4NO_3$ | 0.6, $(NH_4)_2S_2O_8$; 0.2, $Fe(ClO_4)_3$ | 0.29 |
| 16 | $SiO_2$, 8 | 40 | 1.4, $NH_4NO_3$ | 0.8, $(NH_4)_2S_2O_8$; 0.6, $NaBO_3$, 0.1, $(NH_4)_2Ce(NO_3)_6$ | 0.25 |
| 17 | $SiO_2$, 8 | 40 | 1.4, $NH_4NO_3$ | 0.8, $(NH_4)_2S_2O_8$; 0.4, $ClC_6H_4CO_3H$ | 0.21 |
| 18 | $SiO_2$, 8 | 40 | 1.4, $NH_4NO_3$ | 0.3, $(NH_4)_2S_2O_8$; 0.1, NaClO | 0.18 |
| 19 | $SiO_2$, 8 | 40 | 1.4, $NH_4NO_3$ | 0.3, $(NH_4)_2S_2O_8$; 0.3, $NaClO_2$ | 0.20 |

Oxidizers, such as persulfate, perbenzoic acid, nitrite, perborate, hypochlorite and chlorite are chemically unstable in aqueous environments or under acidic pH conditions. These oxidizers undergo self-decomposition (or dissociation) in aqueous In most of these cases, mild acidic pH conditions and elevated temperatures also accelerate the self-decomposition reactions. These decomposition or dissociation reactions result in a reduction over time of available oxidizer concentration in the slurry. This reduction in oxidizer concentration diminishes functionality and effectiveness in commercial polishing applications that require shelf life.

Furthermore, iron and cerium salts can only remain stable under extreme low pH conditions. Elevated pH results in precipitation of iron hydroxide/oxide and cerium hydroxide/oxide. In turn, this precipitation results in a decrease in polishing removal rate and an increase in polishing surface defects.

regime of hours, days or weeks, depending upon each individual compound and the actual conditions. A typical polishing process for nickel-plated hard disk substrates takes minutes to finish. Therefore, this separated two-part slurry approach eliminates the problem.

Another solution for slurries containing iron and cerium salt co-oxidizers is chemical ligands or chelating agents that form stable chemical complexes with the iron or cerium ions. This approach stabilizes iron and cerium salts in aqueous solutions and can dramatically reduce or prevent the formation of iron or cerium hydroxide/oxide precipitates. For example, specific ligands and chelating agents include: EDTA (ethylenediaminetetraacetic acid), its salts and derivatives; malonic acid, its salts and derivatives; ethylene diamine, its salts and derivatives; ammonia and its salts; halides; etc.

Most advantageously, optional anti-coagulation polymers prevent the colloidal spheres from agglomerating, flocculating, coagulating, and gelling. This stable dispersion achieved scratch-free and defect-free surfaces when polishing hard disks. Table 3 shows examples of the polymers that stabilize the silica colloid dispersions.

TABLE 3

Stability of Silica Suspension at Low pH

| Sample ID* | Mean Diameter (nm) | Stabilizer (anti-coagulation/Anti-gelation agent) | wt %** | pH | 24 hr. Stability |
|---|---|---|---|---|---|
| 20 | 100 | None | 0.1 | 2.0 | Gelled |
| 21 | 40 | None | 0.2 | 2.0 | Gelled |
| 22 | 100 | Polyethylene glycol | 0.1 | 2.0 | Thick |
| 23 | 100 | Sodium polyacrylate | 0.1 | 2.0 | Stable |
| 24 | 100 | sodium polyvinylsulfonate | 0.1 | 2.0 | Stable |
| 25 | 100 | sodium polystyrenesulfonate | 0.1 | 2.0 | Stable |
| 26 | 40 | polyethylene glycol | 0.2 | 2.0 | Gelled |
| 27 | 40 | sodium polyacrylate | 0.2 | 2.0 | Thick |
| 28 | 40 | sodium polyvinylsulfonate | 0.2 | 2.0 | Stable |
| 29 | 40 | sodium polystyrenesulfonate | 0.2 | 2.0 | Stable |
| 30 | 40 | polystyrenesulfonic-co-maleic acid, sodium salt | 0.2 | 2.0 | Stable |

*Each of the mixtures contains 30 wt % by weight of colloidal silica particles, 7 wt % aluminum nitrate.
**Percentage ratio of the stabilizer weight over the silica solid weight.

Table 3 illustrates that strong anionic polymers, such as polystyrenesulfonate and polyvinylsulfonate, are the most effective under the described conditions. These anionic polymer molecules adsorb on the colloid particle surfaces and provide steric hindrance to prevent colloids from aggregating and stabilize the colloidal dispersions.

Most advantageously, buffering the slurry to an optimal pH range of about 1 to 5 achieves the optimal polishing performance. In this pH range, the metal oxide colloid surface protonates to carry electrostatic positive charges, which allow better adsorption of anionic characteristic polymers, and thus, better dispersion stability. In addition, this low pH region advantageously provides maximum effectiveness of the multi-oxidizer system and enhances its oxidation potential; and thus, it accelerates the chemical polishing rate. Maintaining the pH level below about 3 can further accelerate the substrate's removal. Most advantageously, this low pH region chemically removes the nickel metal from the disk's surface.

Alternatively, a relatively smooth nickel substrate surface can be obtained by polishing with a softer and smaller particle size alumina-based slurry. The experimental data show that very fine (0.10 to 0.25 $\mu$m) gamma phase slurries can readily achieve a roughness of less than about 3.5 Å.

The use of spherical metal oxide abrasive colloidal particles enhances the substrate surface characteristics, and minimizes or eliminates micro-surface defects. With this slurry hard disk manufacturers can significantly reduce the number of defective products, and cost of production. Optionally, the use of anti-coagulation agents 1) prevents the small abrasives from agglomerating; 2) allows simplified dispersing of the slurry; and 3) extends its shelf life. The use of stable and acidic multi-oxidizer systems enhances the polishing rate by as much as 250 percent and shortens polishing cycle time.

Advantageously, the polishing method includes the following steps for maximizing oxidizer effectiveness. First, introducing a precursor polishing slurry into a mixing vessel. This precursor lacks the co-oxidizer. The polishing slurry contains the polishing particles discussed earlier; at least about 0.5 total weight percent oxidizer, the oxidizer being selected from at least one of the group consisting of $HNO_3$, $Ni(NO_3)_2$, $Al(NO_3)_3$, $Mg(NO_3)_2$, $Zn(NO_3)_2$ and $NH_4NO_3$; and balance water. Then mixing a small but effective amount of at least one co-oxidizer selected from the group consisting of perbromates, perchlorates, periodates, persulfates, permanganates, ferric nitrate, cerium-containing salts, perbenzoic acids, nitrite compounds, perborate compounds, hypochlorite compounds, chlorite compounds and chloride with the precursor polishing slurry in the mixing vessel forms an active polishing slurry. Finally, polishing the substrate with the active polishing slurry's co-oxidizer having at least eighty percent of its as mixed oxidation potential increases the slurry's effectiveness.

For purposes of this specification, as mixed oxidation potential is the potential of the slurry within one minute of mixing as measured with a standard electrode, such as a calomel electrode. Advantageously, the slurry has at least about ninety percent of its as mixed oxidation potential upon introduction into a polishing machine. Most advantageously, the slurry has at least about ninety-five percent of its as mixed oxidation potential as polishing begins. This method is particularly effective when using less stable co-oxidizers, such as persulfate, perbenzoic acid, nitrite, perborate, hypochlorite and chlorite.

Advantageously, the polishing occurs with a conduit functioning as a mixing vessel and a slurry delivery device. Introducing a co-oxidizer into the precursor solution in a conduit forms a two-part slurry stream. As this mixture of co-oxidizer and precursor travels through the conduit, it mixes to form the active polishing slurry. Then delivering or transferring the active polishing slurry through the conduit to the polishing machine provides the active slurry with minimal degradation. Maintaining the conduit adjacent the polishing machine further decrease resonance time for the active slurry in the conduit. Generally, decreasing the holding time in the conduit or mixing vessel tends to increase polishing performance by limiting degradation of the co-oxidizers. For example, a typical holding time for slurries mixed within the conduit is less than about twenty seconds.

Optionally, it is possible to have a holding tank serve as the mixing vessel. With this setup, the precursor solution and co-oxidizer are mixed in the holding tank and then delivered or transferred as an active polishing slurry through a conduit or other means to a polishing machine. This process is more useful when the co-oxidizer has some stability. For example, this process is most effective where the co-oxidizer has at least a one-day shelf life before measurable degradation occurs.

Although this invention disclosure presents only the selected examples of the hard disk polishing slurry compositions, it should be apparent to those skilled in the art that any slurry composition that satisfies the above characteristics will be applicable for the described application. For example, colloidal spheres of various metal oxide materials should be in general suitable for polishing agents. Any water-soluble, periodate salts, nitric salts, nitric salts, permanganate salts, perbromate salts, perbromate salts and their combinations should be suitable for oxidizers and co-oxidizers. Any anionic characteristic polymer such as sulfonate-containing polymer, carboxylate-containing polymer, and their derivatives should be suitable as colloidal dispersion stabilizers. In addition, these chemical materials can be applied to the slurry in the form of either solids or aqueous solutions.

What is claimed is:
1. A polishing slurry comprising polishing particles having a mean particle diameter of less than about 5 $\mu$m; at least about 0.5 total weight percent oxidizer, the oxidizer being selected from at least one of the group consisting of $HNO_3$, $Ni(NO_3)_2$, $Al(NO_3)_3$, $Mg(NO_3)_2$, $Zn(NO_3)_2$ and $NH_4NO_3$; a small but effective amount of at least one co-oxidizer selected from the group consisting of perbromates, perchlorates, periodates, persulfates, permanganates, ferric nitrate, cerium-containing salts, perbenzoic acids, nitrite compounds, perborate compounds, hypochlorite compounds, chlorite compounds and chloride compounds; and balance water.

2. The polishing slurry of claim 1 containing about 0.5 to 7.5 total weight percent oxidizer.

3. The polishing slurry of claim 1 including pH buffers for operating the slurry at a pH from about 1 to 5.

4. The polishing slurry of claim 1 wherein the co-oxidizer is selected from the group consisting of $KIO_4$, $NaIO_4$, $(NH_4)_2S_2O_8$, $K_2S_2O_8$, $Na_2S_2O_8$, $KMnO_4$, $Al(ClO_4)_3$, $KClO_4$, $NaClO_4$, $NH_4ClO_4$, $Fe(ClO_4)_3$, $(NH_4)_2Ce(NO_3)_6$, $NaNO_2$, $KCl$, $NaBO_3$, $ClC_6H_4CO_3H$, $NaClO$, $NaClO_2$, and $Fe(NO_3)_3$.

5. The polishing slurry of claim 1 wherein the slurry contains about 2 to 60 weight percent polishing particles, about 0.01 to 4 total weight percent co-oxidizer and an anti-coagulation agent.

6. The polishing slurry of claim 1 wherein the co-oxidizer is a periodate.

7. The polishing slurry of claim 6 including an additive for binding elemental iodine.

8. The polishing slurry of claim 1 wherein the co-oxidizer is selected from the group consisting of iron and cerium salts and the co-oxidizer contains at least one ligand or chelating agent for stabilizing the co-oxidizer in the slurry.

9. The polishing slurry of claim 1 wherein the co-oxidizer is selected from the group consisting of persulfate, perbenzoic acid, nitrite, perborate, hypochlorite and chlorite.

10. A polishing slurry comprising about 2 to 60 weight percent of a dispersion of polishing particles, the polishing particles having a mean particle diameter of less than about 1 μm; about 0.5 to 7.5 total weight percent oxidizer, the oxidizer being selected from at least of the group consisting of $HNO_3$, $Ni(NO_3)_2$, $Al(NO_3)_3$, $Mg(NO_3)_2$, $Zn(NO_3)_2$ and $NH_4NO_3$; about 0.01 to 4 total weight percent at least one co-oxidizer selected from the group consisting of perbromates, perchlorates, periodates, persulfates, permanganates, ferric nitrate, cerium-containing salts, perbenzoic acids, nitrite compounds, perborate compounds, hypochlorite compounds, chlorite compounds and chloride compounds; an anti-coagulation agent; and balance water.

11. The polishing slurry of claim 10 containing about 0.5 to 5 total weight percent oxidizer.

12. The polishing slurry of claim 10 including pH buffers for operating the slurry at a pH from about 1 to 5.

13. The polishing slurry of claim 10 wherein the co-oxidizer is selected from the group consisting of $KIO_4$, $NaIO_4$, $(NH_4)_2S_2O_8$, $K_2S_2O_8$, $Na_2S_2O_8$, $KMnO_4$, $Al(ClO_4)_3$, $KClO_4$, $NaClO_4$, $NH_4ClO_4$, $Fe(ClO_4)_3$, $(NH_4)_2Ce(NO_3)_6$, $NaNO_2$, $KCl$, $NaBO_3$, $ClC_6H_4CO_3H$, $NaClO$, $NaClO_2$, and $Fe(NO_3)_3$.

14. The polishing slurry of claim 10 wherein the slurry contains polishing particles selected from the group consisting of silica, alumina, ceria, zirconia and titania, about 0.05 to 2 total weight percent co-oxidizer and about 0.001 to 5 total weight percent anti-coagulation agent.

15. The polishing slurry of claim 10 wherein the co-oxidizer is a periodate.

16. The polishing slurry of claim 15 including an additive for binding elemental iodine.

17. The polishing slurry of claim 10 wherein the co-oxidizer is a salt selected from the group consisting of iron and cerium salts and the salt contains a ligand or chelating agent for stabilizing the salt.

18. The polishing slurry of claim 10 wherein the co-oxidizer is selected from the group consisting of persulfate, perbenzoic acid, nitrite, perborate, hypochlorite and chlorite.

19. A polishing slurry comprising about 2 to 60 weight percent of a dispersion of polishing particles selected from the group consisting of silica, alumina, ceria, zirconia and titania the polishing particles having a mean particle diameter of about 0.01 to 1 μm; about 0.5 to 5 total weight percent oxidizer, the oxidizer being selected from at least of the group consisting of $HNO_3$, $Ni(NO_3)_2$, $Al(NO_3)_3$, $Mg(NO_3)_2$, $Zn(NO_3)_2$ and $NH_4NO_3$; about 0.05 to 2 total weight percent at least one co-oxidizer selected from the group consisting of perbromates, perchlorates, periodates, persulfates, permanganates, ferric nitrate, cerium-containing salts, perbenzoic acids, nitrite compounds, perborate compounds, hypochlorite compounds, chlorite compounds and chloride compounds; an anti-coagulation agent; and balance water.

20. The polishing slurry of claim 19 wherein the oxidizer is $NH_4NO_3$.

21. The polishing slurry of claim 19 including pH buffers for operating the slurry at a pH from about 1 to 5.

22. The polishing slurry of claim 19 wherein the co-oxidizer is selected from the group consisting of $KIO_4$, $NaIO_4$, $(NH_4)_2S_2O_8$, $K_2S_2O_8$, $Na_2S_2O_8$, $KMnO_4$, $Al(ClO_4)_3$, $KClO_4$, $NaClO_4$, $NH_4ClO_4$, $Fe(ClO_4)_3$, $(NH_4)_2Ce(NO_3)_6$, $NaNO_2$, $KCl$, $NaBO_3$, $ClC_6H_4CO_3H$, $NaClO$, $NaClO_2$, and $Fe(NO_3)_3$.

23. The polishing slurry of claim 19 containing about 0.001 to 5 total weight percent anti-coagulation agent.

24. The polishing slurry of claim 19 containing an additive for binding iodine and the additive is selected from the group consisting of polyvinylpyridine, polyvinylpyrrolidone, polyvinylpyrrolidone, vinylpyrrolidone/vinylacetate, vinylpyrrolidone/vinylmethacrylate, vinylpyrrolidone/vinylacrylic acid, vinylpyrrolidone/styrene, vinylpyrrolidone/vinylcaprolactam and vinylpyrrolidone/vinylimidazole.

25. The polishing slurry of claim 19 wherein the co-oxidizer is a salt selected from the group consisting of iron and cerium salts and the salt contains a ligand or chelating agent for stabilizing the salt.

26. The polishing slurry of claim 19 wherein the co-oxidizer is selected from the group consisting of persulfate, perbenzoic acid, nitrite, perborate, hypochlorite and chlorite.

27. A method of polishing comprising the steps of:
  a) introducing a precursor polishing slurry into a mixing vessel, the precursor polishing slurry containing polishing particles, the polishing particles having a mean particle diameter of less than about 5 μm and at least about 0.5 total weight percent oxidizer, the oxidizer being selected from at least one of the group consisting of $HNO_3$, $Ni(NO_3)_2$, $Al(NO_3)_3$, $Mg(NO_3)_2$, $Zn(NO_3)_2$ and $NH_4NO_3$; and balance water;
  b) mixing a small but effective amount of at least one co-oxidizer selected from the group consisting of perbromates, perchlorates, periodates, persulfates, permanganates, ferric nitrate, cerium-containing salts, perbenzoic acids, nitrite compounds, perborate compounds, hypochlorite compounds, chlorite compounds and chloride compounds with the precursor polishing slurry in the mixing vessel to form an active polishing slurry; and c) polishing a substrate with the active polishing slurry, the active slurry having at least about eighty percent of its as mixed oxidation potential as measured with a standard electrode.

28. The method of claim 27 wherein the mixing forms the active slurry having at least about ninety percent of its as mixed oxidation potential as measured with a standard electrode.

29. The method of claim 28 wherein the mixing forms the active slurry having at least about ninety-five percent of its as mixed oxidation potential as measured with a standard electrode.

30. The method of claim 27 wherein the mixing occurs with the mixing vessel being a conduit adjacent a polishing machine and the polishing occurs in the polishing machine; and including the additional step of transferring the active polishing slurry through the conduit to the polishing machine.

31. The method of claim 27 wherein the mixing occurs with the mixing vessel being a holding tank and the polishing occurs in a polishing machine; and including the additional step of transferring the active polishing slurry from the holding tank to the polishing machine.

32. The method of claim 27 wherein the mixing occurs with the co-oxidizer selected from the group consisting of persulfate, perbenzoic acid, nitrite, perborate, hypochlorite and chlorite.

* * * * *